United States Patent
Kushwah

(10) Patent No.: US 7,577,808 B1
(45) Date of Patent: Aug. 18, 2009

(54) EFFICIENT BACKUP DATA RETRIEVAL

(75) Inventor: Ajay Pratap Singh Kushwah, San Ramon, CA (US)

(73) Assignee: EMC Corporation, Hopkinton, MA (US)

( * ) Notice: Subject to any disclaimer, the term of this patent is extended or adjusted under 35 U.S.C. 154(b) by 342 days.

(21) Appl. No.: 11/473,475

(22) Filed: Jun. 23, 2006

(51) Int. Cl.
G06F 13/00 (2006.01)
G06F 13/28 (2006.01)
G06F 12/00 (2006.01)
G06F 17/30 (2006.01)

(52) U.S. Cl. ........................................ 711/162; 707/202

(58) Field of Classification Search .................. 711/162; 707/202
See application file for complete search history.

(56) References Cited

U.S. PATENT DOCUMENTS 7,440,965 B1 * 10/2008 Pruthi et al. ................. 707/102
2005/0246510 A1 * 11/2005 Retnamma et al. .......... 711/162

\* cited by examiner

*Primary Examiner*—Matt Kim
*Assistant Examiner*—Edward J Dudek
(74) *Attorney, Agent, or Firm*—Van Pelt, Yi & James LLP

(57) ABSTRACT

Retrieving information is disclosed. A contiguous group of blocks is determined, where a contiguous group of blocks comprises of at least one of a plurality of blocks associated with one or more data objects to be restored and at least one block not associated with the one or more data objects to be restored. The contiguous group of blocks is obtained.

18 Claims, 13 Drawing Sheets

Metadata Table

200

|  | File size | Permissions | Block Location |
|---|---|---|---|
| Inode 1 |  |  |  |
| Inode 2 |  |  |  |
| Inode 3 |  |  |  |
| Inode 4 |  |  |  |

FIG. 2A

EFFICIENT BACKUP DATA RETRIEVAL

BACKGROUND OF THE INVENTION

In some block based backup systems, files or other data objects are backed up by storing blocks associated with the data objects being backed up. Blocks and associated metadata are updated as needed and are retrieved in the event a file or other data object is restored. During restoration, blocks and other information (e.g., an inode number associated with files being restored and/or physical locations of blocks associated with those files) are retrieved from backup media or other memory. For example, for each file to be restored in some systems a file name is mapped to an inode number, the inode number is used to identify blocks comprising the file and the location at which each block is stored on backup media, the blocks comprising the file are read from the backup media, and the blocks read from backup media are used to restore the file to the destination machine. In some cases, if many files are restored in a single operation, e.g., a large directory containing a million or more files, some block based backup systems take a significant amount of time to perform the operation, in part due to the overhead and idle time associated with restoring so many files. It would be desirable to reduce the amount of time to restore files using a block based backup system.

BRIEF DESCRIPTION OF THE DRAWINGS

Various embodiments of the invention are disclosed in the following detailed description and the accompanying drawings.

FIG. 2A is a diagram illustrating an embodiment of a metadata table associated with block based backup.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Restoring files using blocks stored on backup media is disclosed. Information associated with restoring one or more data objects (e.g., files) to a restoration target is retrieved. A plurality of blocks associated with one or more data objects to be restored is determined. In some embodiments, a list of blocks is received. In some embodiments, a plurality of blocks is determined, for example, by receiving a list of files to restore, determining inode numbers associated with those files, and retrieving locations of associated blocks from a metadata table using the inode numbers. A contiguous group of blocks is determined that comprises (1) at least one of the plurality of blocks associated with the one or more data objects to be restored and (2) at least one block not so associated. In some embodiments, a block not associated with a data object being restored is an "empty" block or is associated with a data object but that data object is not being restored. The contiguous group of blocks is obtained.

Figure 1:
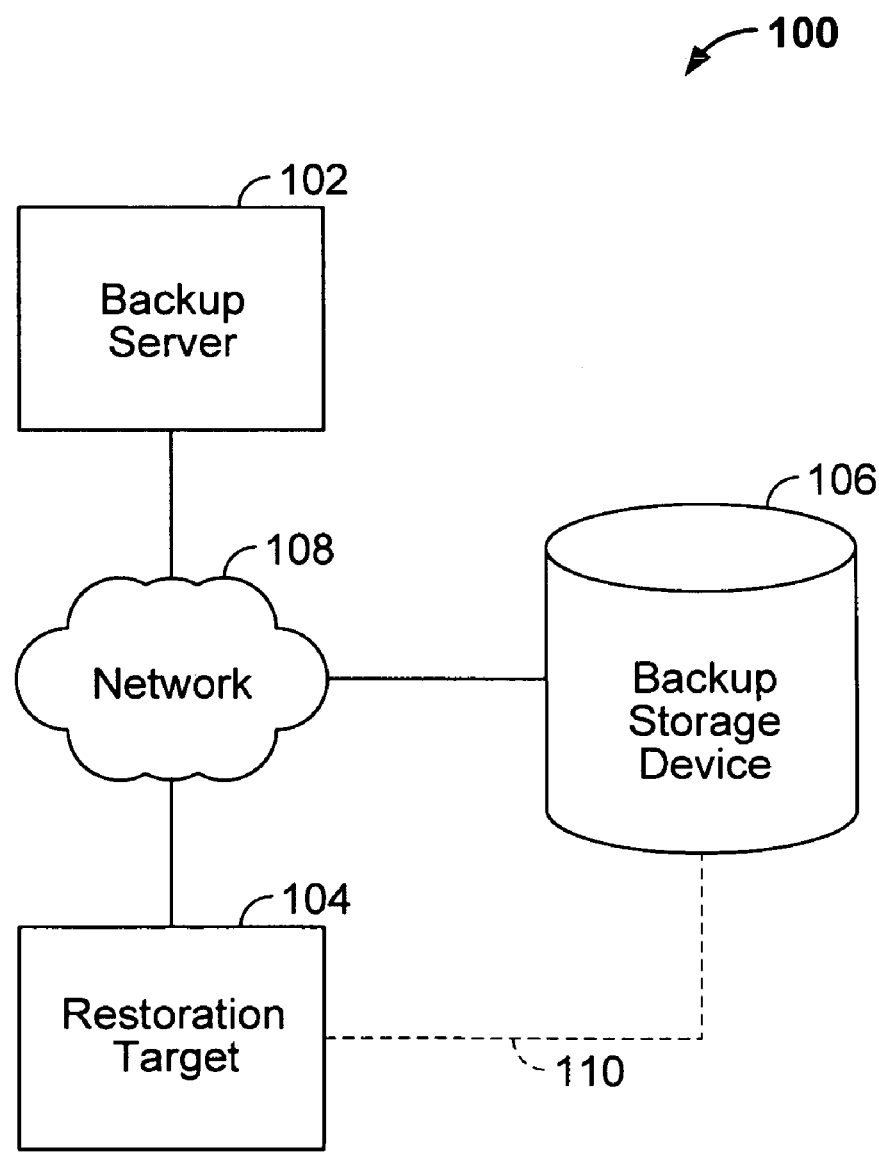
FIG. 1 is a system diagram illustrating an embodiment of a backup system.

FIG. 1 is a system diagram illustrating an embodiment of a backup system. In the example shown, backup system 100 stores data associated with one or more files (or other data objects) to back up those files. In some embodiments, backup server 102 performs backup related functionality such as managing data backup and managing the retrieval of stored data during restoration. In some embodiments, backup server 102 interacts with a client or other agent running on restoration target 104 and/or backup storage device 106 that is configured to communicate with backup server 102.

During a backup, backup server 102 in some embodiments determines appropriate data to store and passes this data to backup storage device 106 to be stored. In some embodiments, backup server 102 directs a client or agent to pass data to be saved directly to backup storage device 106. In some embodiments, backup server 102 manages the organization and controls where information is stored on backup storage device 106, for example by maintaining a table or list of stored information and corresponding physical locations on backup storage device 106. During a restore, in some embodiments backup server 102 receives, e.g., from restoration target 104, a list of files or other data objects to be restored to restoration target 104. To restore those files on restoration target 104, information associated with those files is retrieved from backup storage device 106 and passed to restoration target 104.

Backup storage device 106 includes backup media for storing information. Storage media associated with backup storage device 106 includes, for example, magnetic tape media, hard disk media, optical storage media, etc. In some embodiments, backup storage device 106 comprises multiple physical devices that are coupled to each other via a connection or network. In some embodiments, backup storage device 106 is associated with multiple restoration targets.

In some embodiments, block based backup is performed by storing on backup media multiple blocks of data associated with a particular file. For example, typically files stored on restoration target 104 are organized and accessed using a file system. Each file typically has a name or other identifier, and the files typically are organized hierarchically into one or more levels of directories. The data comprising a file is stored typically as a plurality of blocks of data on physical storage, such as a hard disk. Data is not necessarily stored in (for example) file offset order on physical storage. During a block based backup, the blocks comprising a file to be backed up, or in some cases those blocks that have changed since a previous backup, are copied and stored on backup media, such as backup storage device 106, which may comprise fixed storage such as one or more hard drives and/or removable media such as tape, optical disk storage, etc. In some embodiments, multiple files are backed up and each backed up file is associated with its own group of blocks (i.e., a given block is associated with at most one file). Blocks are stored on backup storage device 106. During a restore, blocks associated with the file(s) being restored are retrieved from backup storage device 106 and are used to restore the file(s). Some block based backup systems offer advantages or conveniences over non-block based backup systems (e.g., traditional file based backup systems). For example, in some block based backup systems only the blocks that have changed since the last backup backed up, a backup storage device is used more efficiently since smaller units of information are stored, etc. In some embodiments, blocks for a particular file are not necessarily stored next to each other on backup storage device 106 and blocks associated with different files may be intermingled. For example, if a file A comprises blocks A1, A2, and A3, and a file B comprises blocks B1 and B2, the blocks may be stored on backup media in the order A1-B1-A2-A3-B2. Blocks from still other files may also be intermingled with the ones in the preceding example, and/or empty blocks may exist where no backup data is currently stored.

Restoration target 104 in the example shown is the device on which one or more files or other data objects are to be restored using backup data stored on backup storage device 106. It is not necessary for a file being restored to have been created and/or stored previously on restoration target 104. In some embodiments, restoration target 104 is in an initial or empty state and one or more files are created and filled with information from blocks stored on backup storage device 106, e.g., as a result of having been backed up from a host other than restoration target 104. In some embodiments, a file being restored was originally stored on and backed up from restoration target 104 but (for example) becomes corrupted and is restored using the backup data.

Backup server 102, backup storage device 106, and restoration target 104 communicate via network 108. In some embodiments, an optional additional or separate connection 110 between restoration target 104 and backup storage device 106, e.g., a direct connection and/or a connection via a storage area network (SAN), is used. Connection 110 is optional and is not implemented in some embodiments. In some embodiments, information that is retrieved from backup storage device 106 is passed to restoration target 104 using connection 110 rather than network 108. Network 108 and connection 110 can be implemented using a variety of networks and connections such as a Storage Area Network (SAN) and Small Computer System Interface (SCSI). In some embodiments, the network/connection topography and/or the number of components included in backup system 100 varies from the example shown.

FIG. 2A is a diagram illustrating an embodiment of a metadata table associated with block based backup. In the example shown, metadata table 200 includes four mode entries. An inode is associated with a file, directory, or other object on a file system and includes information used in restoring a file to a restoration target. In some embodiments, each file (or other data object) is associated with a particular inode that has a unique inode number. For example, inodes 1-4 are associated with files A-D, respectively. File size (e.g., in bytes), permissions associated with a file (e.g., readable, writeable, etc.), and block location (e.g., physical location(s) of associated blocks on backup media) are stored in metadata table 200 for each inode. In some embodiments, other information in addition to or as alternative to the example shown in FIG. 2A is stored, such as a file offset (e.g., the offsets in a file that each block associated with that file is respectively written to during a restore). In this example, an inode number (e.g., inode 1, inode 2, etc.) associated with a file is used to access or otherwise retrieve information from metadata table 200 for a given file (i.e., metadata table 200 is organized according to inode number rather than, for example, file name).

Metadata table 200 is updated as appropriate to backup one or more files. For example, a new inode entry is created to reflect a new file, or file size is entered or updated to reflect the current file size. During a restore, information stored in metadata table 200 is retrieved and used in restoring a file to a restoration target. For example, to restore a file associated with inode 1, block location(s) are retrieved from the entry for inode 1. Blocks at those locations are retrieved (e.g., from backup media associated with a backup storage device) and are used to restore that file.

Metadata table 200 is updated by or in general managed by any appropriate entity and is stored on any appropriate device. In some embodiments, metadata table 200 is managed by and stored on a backup server. In some embodiments, metadata table 200 is stored on a backup storage device.

Figure 2B:
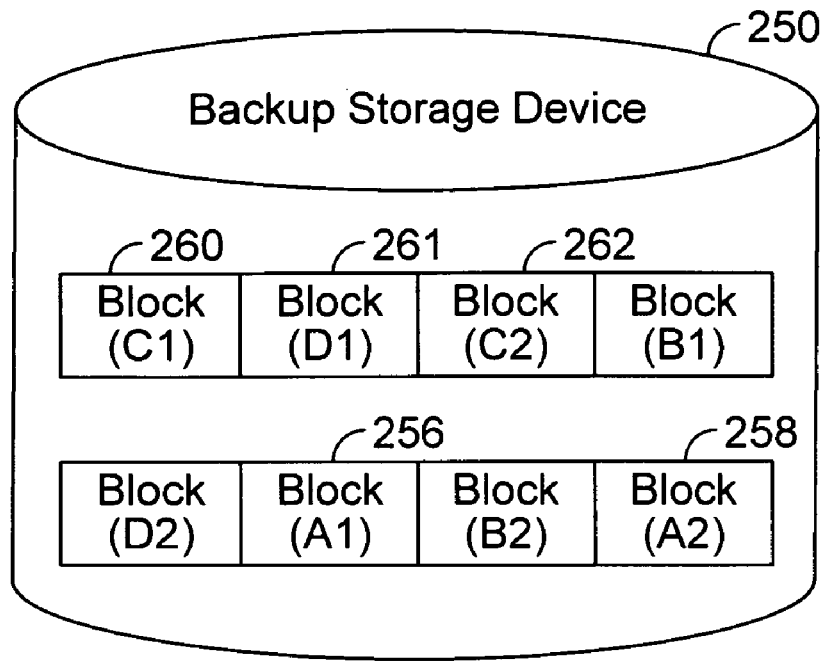
FIG. 2B is a diagram illustrating an embodiment of blocks retrieved from a backup storage device and forwarded to a restoration target.
Figure 2B:
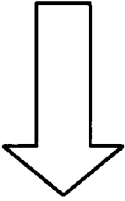
Figure 2B:
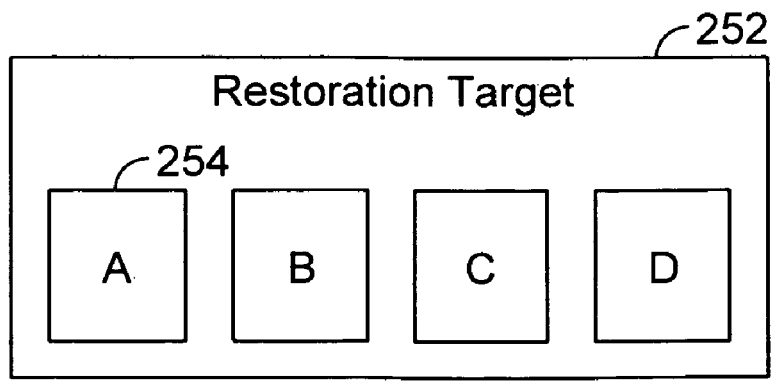

FIG. 2B is a diagram illustrating an embodiment of blocks retrieved from a backup storage device and forwarded to a restoration target. In the example shown, blocks associated with files A-D are stored on backup media associated with backup storage device 250. Blocks associated with a given file are not necessarily stored next to each other. To restore one or more files, blocks associated with the files being restored are retrieved from backup storage device 250 and are forwarded to restoration target 252. For example, to restore file A 254, blocks A1 256 and A2 258 are retrieved from backup storage device 250 and forwarded to restoration target 252. In some embodiments, the physical locations of the blocks retrieved from backup storage device 250 are obtained from a metadata table. At restoration target 252, blocks are used to restore the desired files. For example, file A 254 is created or opened and data in blocks A1 256 and A2 258 are written to the file.

In some embodiments, certain methods of retrieving or otherwise accessing information from metadata table 200 and/or backup storage device 250 are faster or otherwise more desirable than other methods. For example, when reading or otherwise retrieving information for multiple inodes from metadata table 200 it is faster in some embodiments to read them in inode number order. In some embodiments, it is faster to retrieve blocks from backup storage device 250 in block location order rather than retrieving blocks non-sequentially. In some embodiments, blocks in addition to those that are associated with a file being restored are retrieved from backup storage device 250.

Figure 3:
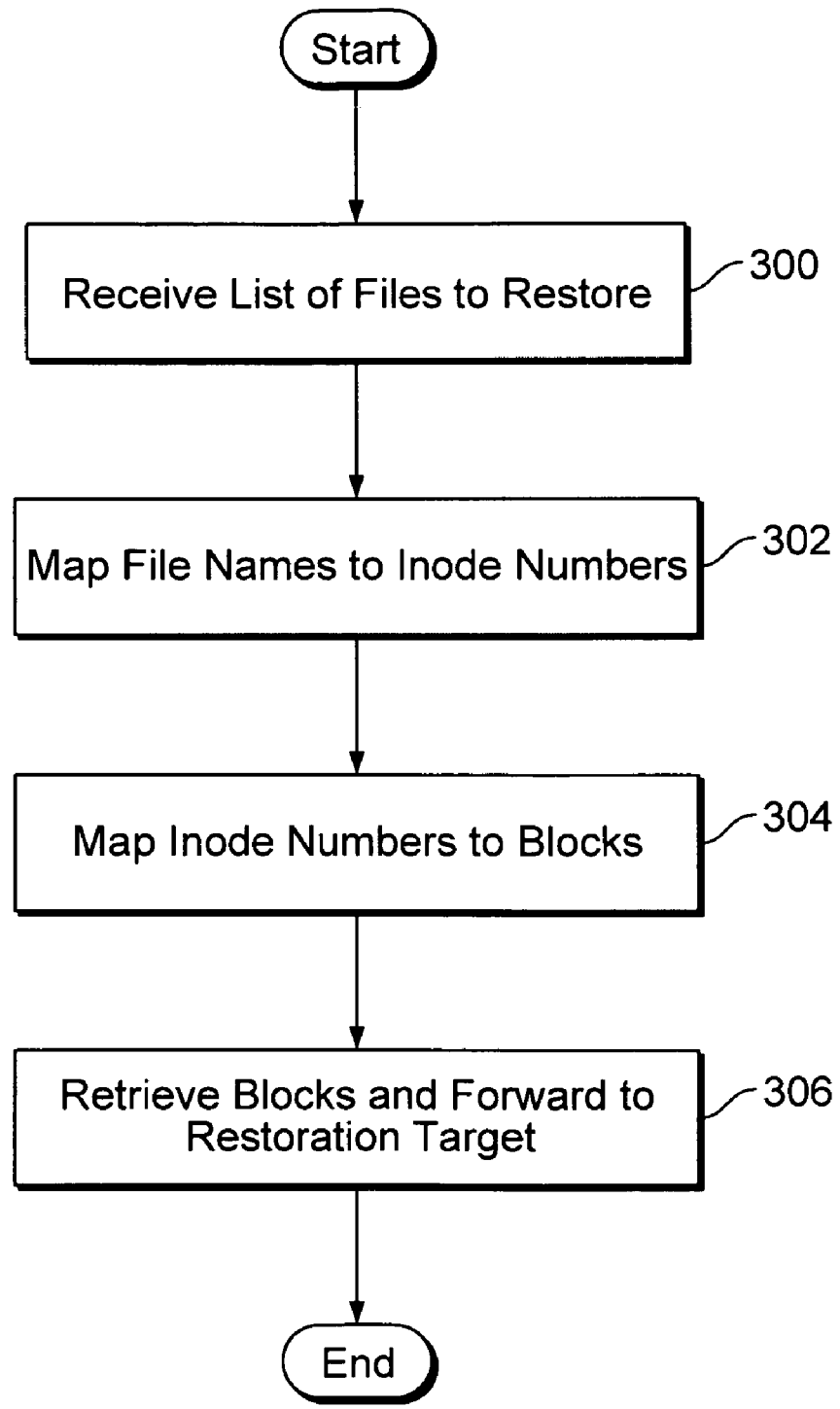
FIG. 3 is a flowchart illustrating an embodiment of a process performed by a backup server to restore one or more files on a restoration target.

FIG. 3 is a flowchart illustrating an embodiment of a process performed by a backup server to restore one or more files on a restoration target. In the example shown, block based backup is performed. In some embodiments, a client or other agent running on a restoration target and/or a backup storage device perform counterpart processing.

At 300, a list of files to restore is received. In some embodiments, a list of files to restore is received from a restoration target. In some embodiments, in addition to or as an alternative to file name, the list of names includes location with a file system hierarchy, version of the file to restore, restore settings (e.g., overwrite any existing file or restore a file while maintaining any existing version), etc.

File names are mapped to inode numbers at 302. In some embodiments, a record, table, or metadata is used to map file name to inode number. In some embodiments, such a record of file names and inode numbers is maintained by a backup server. At 304 inode numbers are mapped to blocks. In some embodiments, mapping is performed using a metadata table. Using a metadata table, the physical locations of blocks associated with the files being restored are obtained. In some embodiments, a metadata table is read or otherwise accessed in an order that reflects how inodes are stored in a metadata table. In some embodiments, a metadata table is accessed in any order. In some embodiments, only inodes entries of interest are accessed from a metadata table. For example, files corresponding to inode numbers 100, 250, 500, 700, and 800 are being restored on a restoration target. Some block backed backup systems are configured to access a metadata table only at the entries that correspond to inode numbers 100, 250, 500, 700, and 800; other entries in a metadata table are unread in systems that are so configured.

Blocks are retrieved and forwarded to a restoration target at 306. In some embodiments, additional blocks (e.g., "empty" blocks or blocks that are associated with files that are not being restored) are retrieved and/or forwarded at 306. In some embodiments, it is faster to retrieve needed blocks and some additional blocks rather than retrieve only blocks that are needed.

Figure 4:
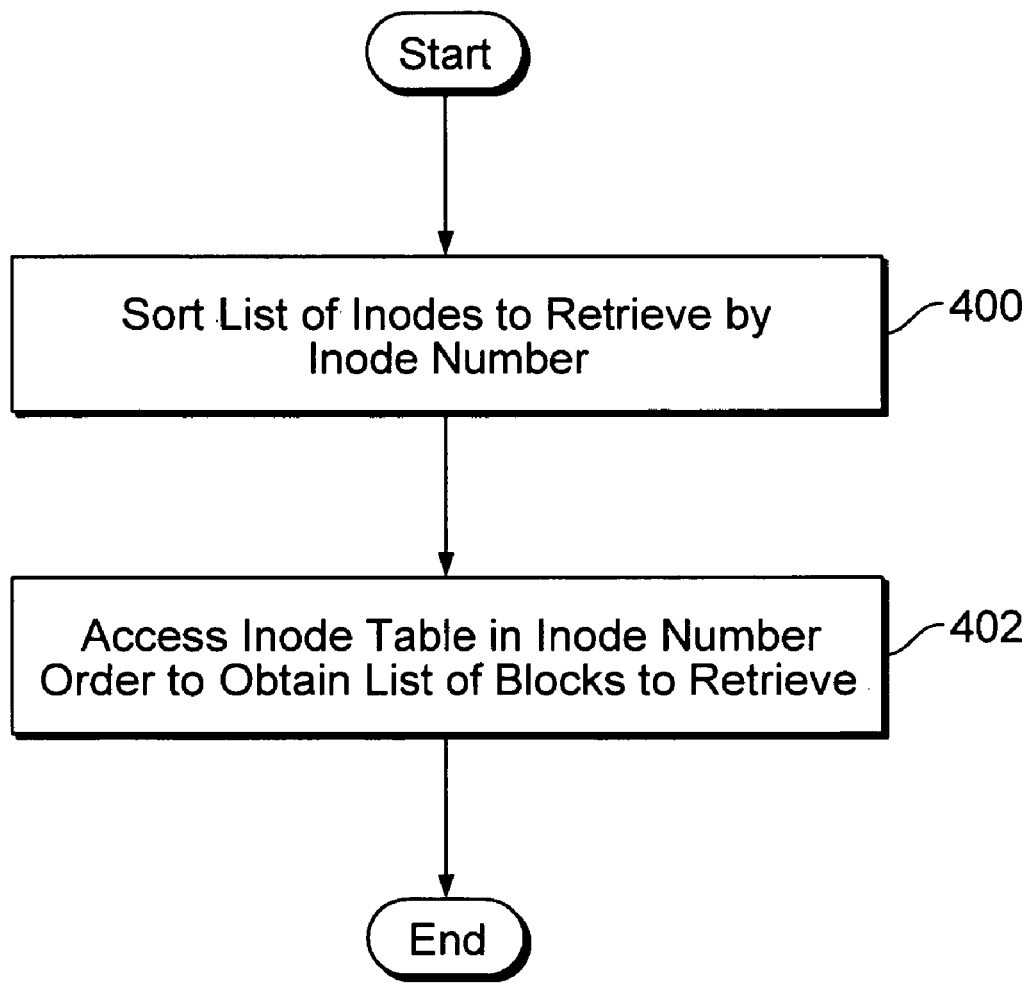
FIG. 4 is a flowchart illustrating an embodiment of a process for determining block location using an inode.

FIG. 4 is a flowchart illustrating an embodiment of a process for determining block location using an inode. In the example shown, the process is used in some embodiments to perform mapping at 304. In some embodiments, another process for determining block location using an inode is used, including accessing a metadata table out of inode number order.

At 400, a list of inodes to retrieve is sorted by inode number. For example, a list containing inode numbers 3, 4, and 1 is received (i.e., files associated with those inodes are being restored). The sorted list is inode 1, 3, and 4.

At 402, a metadata table is accessed in inode number order to obtain a list of blocks to retrieve. A metadata table is read or otherwise accessed according to the ordering of a sorted list obtained at 400. For example, an entry for inode 1 is accessed, then an entry for inode 3, and then an entry for inode 4. In some systems, accessing a metadata table in inode number order is a fast, efficient, or otherwise desirable way of accessing a metadata table and determining block location using an inode. In some embodiments, a metadata table is accessed in any order. In such systems, step 400 is not performed and accessing at step 402 is performed in any order.

Figure 5:
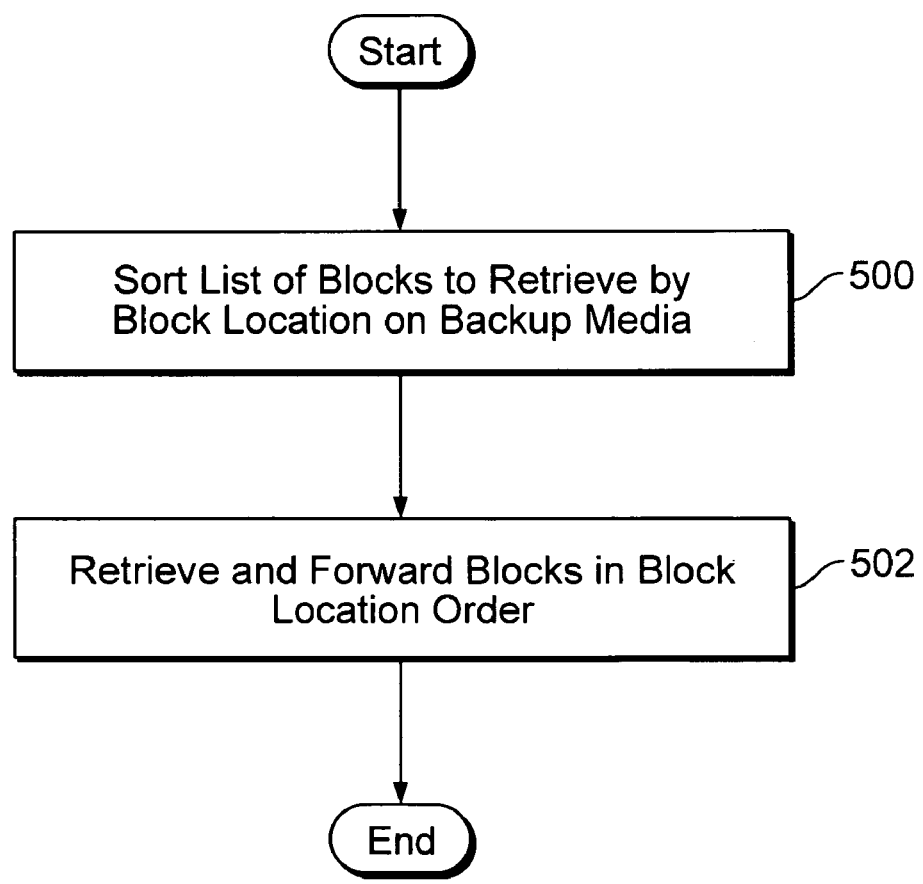
FIG. 5 is a flowchart illustrating an embodiment of a process for retrieving blocks from backup media associated with a backup storage device.

FIG. 5 is a flowchart illustrating an embodiment of a process for retrieving blocks from backup media associated with a backup storage device. In the example shown, the process is used in some embodiments to perform retrieval at 306. In some embodiments, an alternative process is used to retrieve blocks from backup media.

At 500, a list of blocks to retrieve is sorted by block location on backup media. In some embodiments, a list of blocks is sorted according to the physical location of those blocks on backup media (e.g., magnetic tape media, hard disk media, etc.) associated with a backup storage device. Referring to the example of FIG. 2B, to restore files A and C on restoration target 252, blocks 256 and 258 (associated with file A) and blocks 260 and 262 (associated with file C) are retrieved from backup storage device 250. In some embodiments, the sorted list comprises block 260, block 262, block 256, and block 258 in systems where backup media associated with backup storage device 250 is read from left to right and top to bottom. In various embodiments, the sorted list includes additional blocks (e.g., if additional files are being restored) and/or the sorted list is reversed if, for example, backup media is read from right to left and bottom to top, etc.

Blocks are retrieved and forwarded in block location order at 502. For example, blocks 260, 262, 256, and 258 are retrieved in that order from backup media associated with backup storage device 250 and are forward to restoration target 252. In some systems, retrieving blocks in block location order is a fast, efficient, or otherwise desirable way of retrieving blocks from backup media.

Retrieving from backup media one or more groups of blocks stored contiguously on the backup media, including if necessary and/or in at least some cases blocks that are not associated with a file being restored is disclosed. In some embodiments, blocks that are not associated with a file being restored are and/or may be forwarded to a restoration target. In some embodiments, a contiguous group of blocks that includes at least one block that is not associated with a file being restored and at least one block that is so associated is retrieved.

Figure 6:
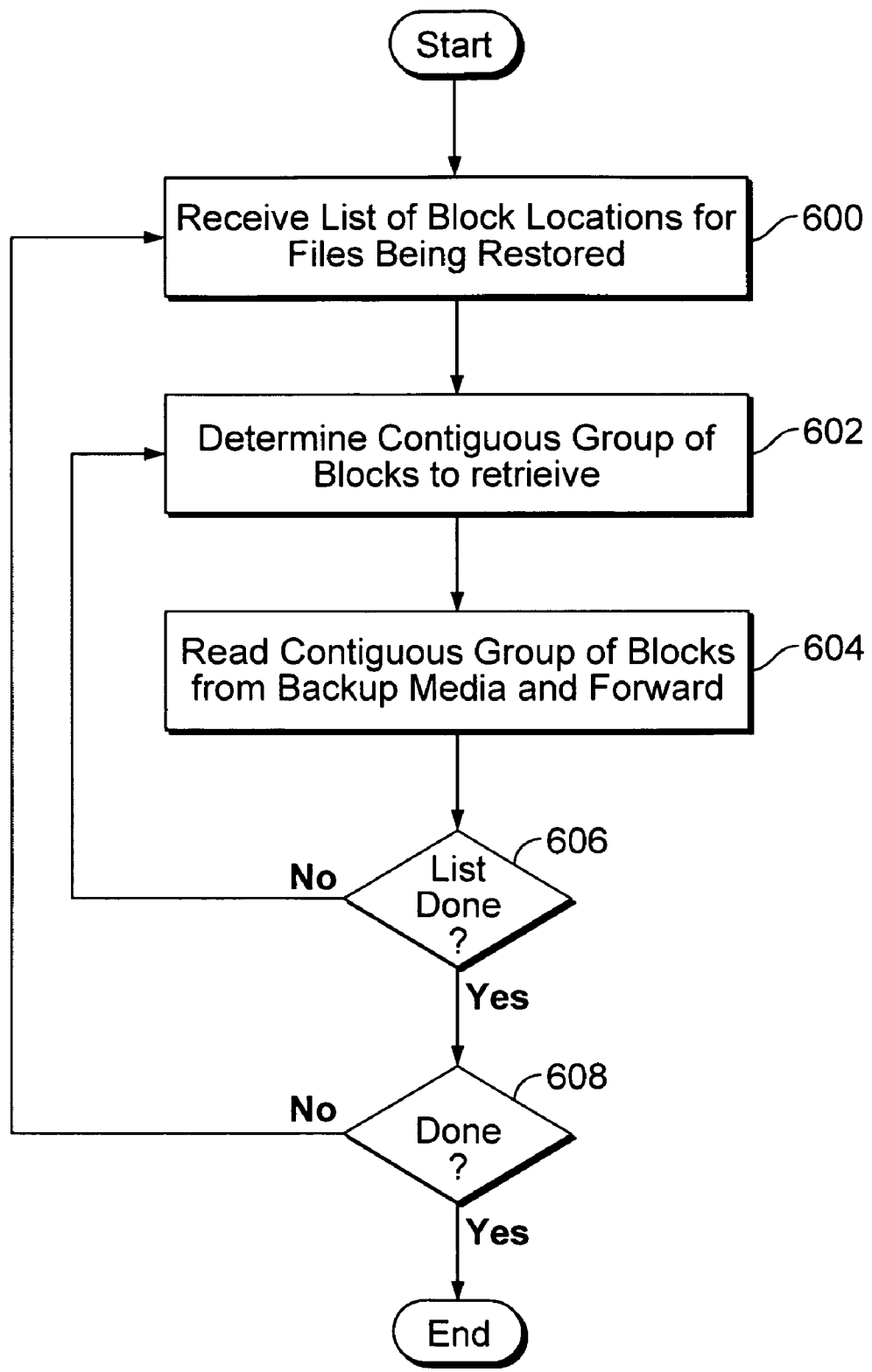
FIG. 6 is a flowchart illustrating an embodiment of retrieving and forwarding a contiguous group of blocks.

FIG. 6 is a flowchart illustrating an embodiment of retrieving and forwarding a contiguous group of blocks. In the example shown, a contiguous group of blocks includes at least one block that is not associated with a file being restored and at least one block that is associated with a file being restored. In some embodiments, blocks that are not associated with a file being restored are forwarded to a restoration target where a client or other agent running on the restoration target processes the blocks to determine which blocks to use and which blocks to discard. In some embodiments, blocks that are not associated with a file being restored are not forwarded to a restoration target (e.g., an agent or other process running on a backup storage device or a backup server discards appropriate blocks before blocks are forwarded to a restoration target). A client running on a restoration target in such systems does not need to determine whether or not to discard a block. A block based backup system where a contiguous group of blocks is retrieved is configured or otherwise implemented in a variety of ways in a variety of embodiments.

At 600, a list of block locations is received for files being restored. One or more files are restored on a restoration target and blocks at locations in the list correspond to the files being restored. In some embodiments, a sorted list is received, for example, according to block location. In some embodiments, an unsorted list is received.

A contiguous group of blocks to retrieve is determined at 602. A contiguous group of blocks includes at least one block that is not associated with a file being restored (e.g., an "empty" block is not being used to store data or a block that is associated with a file that is not being restored) and at least one block that is associated with a file being restored. For example, if in FIG. 2B file C is being restored and file D is not, in some embodiments a contiguous group of blocks includes blocks 260-262. Block 261 is associated with file D, which is not being restored, and blocks 260 and 262 are associated with file C, which is being restored. A contiguous group of blocks is determined in a variety of ways and some embodiments are described in further detail below.

A contiguous group of blocks is read from backup media and forwarded at 604. In some embodiments, blocks are passed from a backup storage device to a restoration target (e.g., through connection 110). In some embodiments, blocks are passed from a backup storage device to a backup server. In some embodiments, blocks that are not associated with a file being restored are removed or filtered before they are passed or forwarded to a restoration target. In some embodiments, these blocks are passed or forwarded to a restoration target and a client or agent running on the restoration target discards appropriate blocks.

At 606 it is decided whether a list is done. For example, if all blocks in a list have been retrieved and forwarded, the list is done. If a list is not done, a contiguous group of blocks to retrieve is determined at 602. In some embodiments, a list is updated to reflect the blocks that have been retrieved and forwarded and the updated list is used to determine a new contiguous group of blocks to retrieve. If a list is done, it is decided at 608 whether the process is done. If it is not done, a list of block locations is received at 600.

Figure 7:
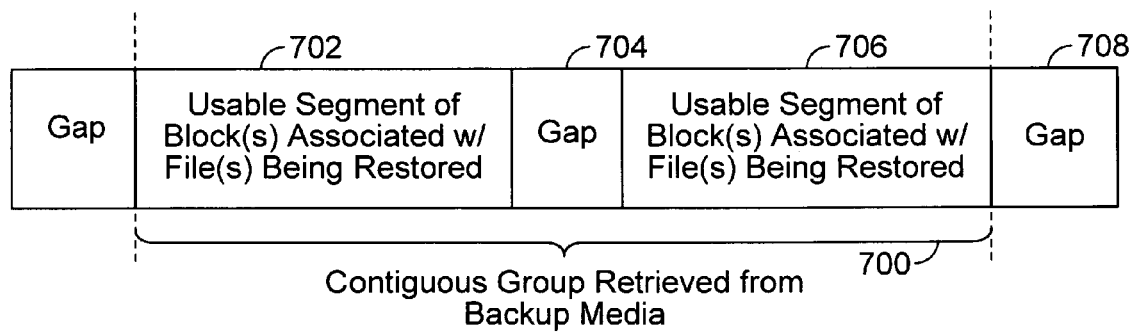
FIG. 7 is a diagram illustrating an embodiment of a contiguous group of blocks stored in backup media.

FIG. 7 is a diagram illustrating an embodiment of a contiguous group of blocks stored in backup media. In the example shown, contiguous group 700 begins and ends with blocks that are associated with a file being restored. There are one or more files or other data objects being restored. Usable segments 702 and 706 are separated by gap 704. A usable segment is defined to be a group of blocks where each block in the group is associated with a file to be restored and the usable segment could have blocks corresponding to one or many such files being restored. A gap is defined to be a group of blocks where each block is not associated with any of the files being restored (e.g., blocks that are associated with a file not being restored, "empty" blocks, etc.). Usable segments are not necessarily the same length. Similarly, gaps are not necessarily the same length. In some embodiments, a usable segment or gap comprises a single block. In some embodiments, a contiguous group of blocks to retrieve includes three or more usable segments separated by two or more gaps. In some embodiments, a contiguous group of blocks to retrieve begins and/or ends with a gap.

Contiguous group 700 is shown stored in backup media associated with a backup storage device. When retrieved from backup media, contiguous group 700 is retrieved rather than, for example, skipping or otherwise not retrieving the block(s) in gap 704. Retrieving contiguous group 700 in some block based backup systems is a fast or otherwise efficient way of retrieving blocks (e.g., compared to retrieving usable segments 702 and 706 separately and not retrieving gap 704).

It is not necessary for a contiguous group of blocks to include all blocks that are associated with files being restored. In some embodiments, multiple groups of contiguous blocks are retrieved from backup media associated with a backup storage device. Appropriate decision making is performed to determine a contiguous group of blocks to retrieve. In some embodiments, determining a contiguous group of blocks to retrieve varies based on factors such as read access time for a particular type of backup media, total number of files being restored, total number of blocks that are associated with those files being restored, the size of a block, etc. In some embodiments, a minimum or maximum threshold is used in determining a contiguous group of blocks to retrieve. A threshold in some embodiments is compared to an individual usable segment or gap and in some embodiments is compared to a (potential) contiguous group of blocks. The following figures illustrate some embodiments for determining a contiguous group of blocks.

Figure 8A:
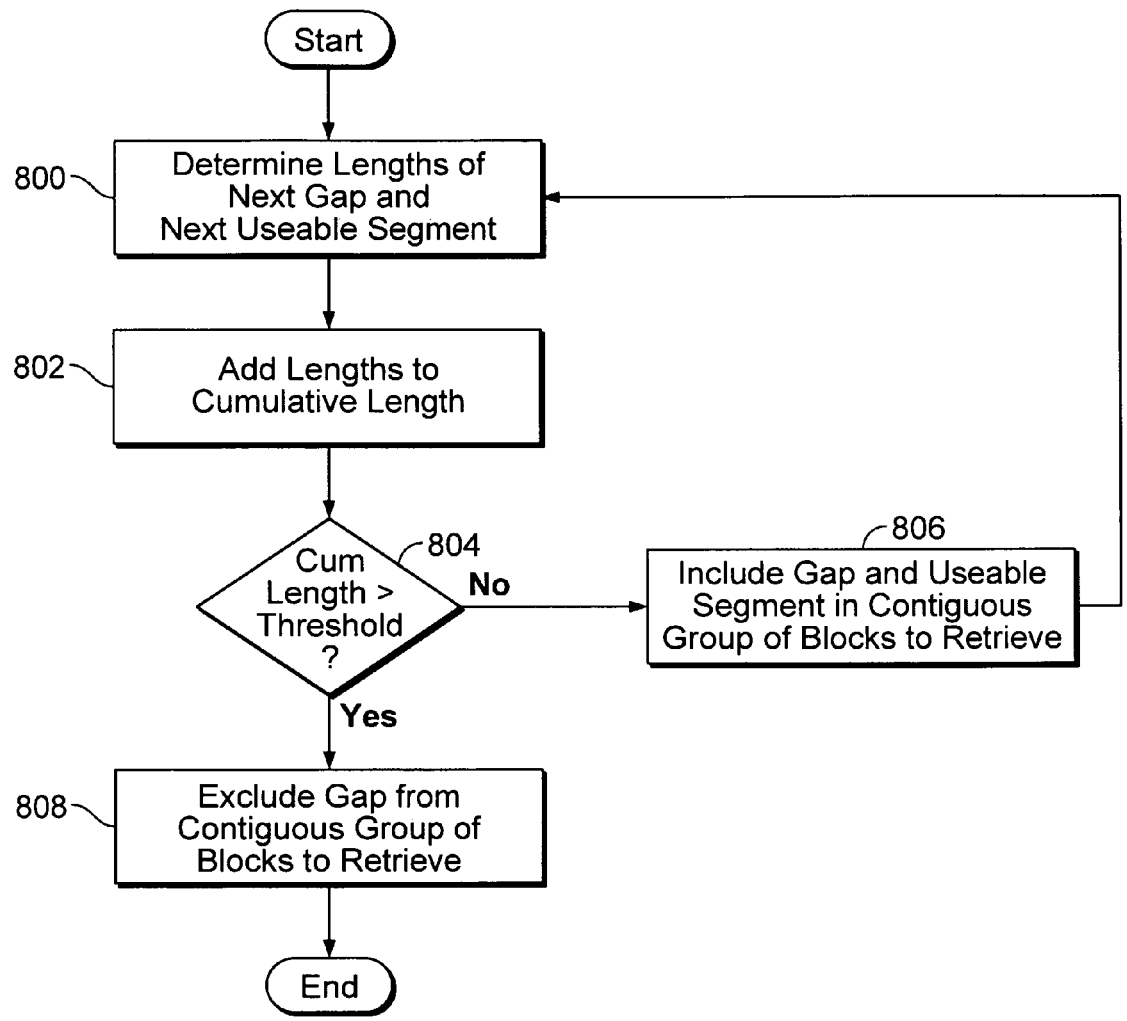
FIG. 8A is a flowchart illustrating an embodiment of a process for determining a contiguous group of blocks to retrieve based on cumulative length.

FIG. 8A is a flowchart illustrating an embodiment of a process for determining a contiguous group of blocks to retrieve based on cumulative length. In the example shown, the length of a contiguous group of blocks is limited to a maximum length.

At 800, lengths are determined for a next gap and next usable segment. As defined above, usable segments include blocks that are associated with a file being restored, whereas gaps include blocks that are not so associated. Lengths are determined in any appropriate unit. The lengths are added to a cumulative length at 802. A cumulative length is defined to be the length of a potential contiguous group of blocks to retrieve. For example, usable segment 702 and gap 704 in FIG. 7 are the first lengths determined. These lengths are added to an initial cumulative length of 0. At the next pass or iteration, the cumulative length is the sum of lengths for usable segment 702 and gap 704, and lengths for usable segment 706 and gap 708 are added to that.

It is decided at 804 if a cumulative length is greater than a threshold. In some embodiments, the cumulative length includes the cumulative length of all segments, including usable segments and gaps, determined so far to be included in the contiguous set of blocks. In some embodiments, only gap lengths are included in the cumulative length determined and/or updated at 804. If a cumulative length is not greater than a threshold, the gap and usable segment are included in a contiguous group of blocks to retrieve at 806 and lengths of a next gap and usable segment are determined at 800. If a cumulative length is greater than a threshold, at 808 the gap is excluded from a contiguous group of blocks to retrieve. In some embodiments, the next contiguous group of blocks begins with the next usable segment that was not included in the previous contiguous group of blocks.

Figure 8B:
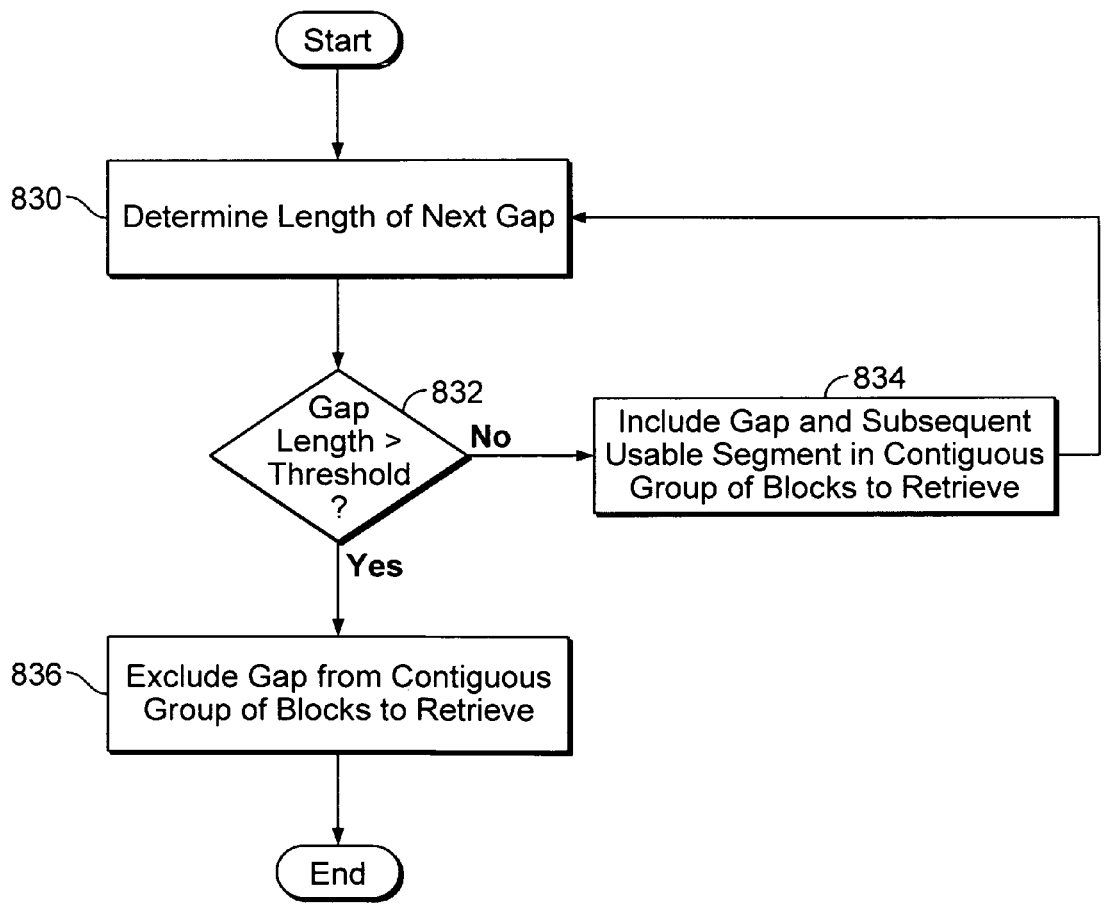
FIG. 8B is a flowchart illustrating an embodiment of a process for determining a contiguous group of blocks to retrieve based on gap length.

FIG. 8B is a flowchart illustrating an embodiment of a process for determining a contiguous group of blocks to retrieve based on gap length. In the example shown, a threshold is used to exclude gaps from a contiguous group of blocks if the length of a gap is greater than a threshold. By comparing gap length to a threshold, a contiguous of blocks excludes gaps with relatively long or otherwise unacceptable lengths.

At 830, a length of a next gap is determined. In some embodiments, at a first pass the length of a gap that follows a first usable segment is determined (e.g., gap 704). It is decided at 832 whether a gap length is greater than a threshold. If a gap length is not greater than a threshold, a gap and subsequent usable segment are included in a contiguous group of blocks to retrieve at 834 and the length of a next gap is determined at 830. For example, gap 704 and usable segment 706 are included in a contiguous group of blocks that begins with usable segment 702. If a gap length is greater than a threshold, the gap is excluded from a contiguous group of blocks to retrieve at 836. In some embodiments, the next contiguous group of blocks to retrieve begins with a subsequent usable segment. For example, one contiguous group includes usable segment 702 and another contiguous group begins with usable segment 704 if gap 704 is too long.

Figure 8C:
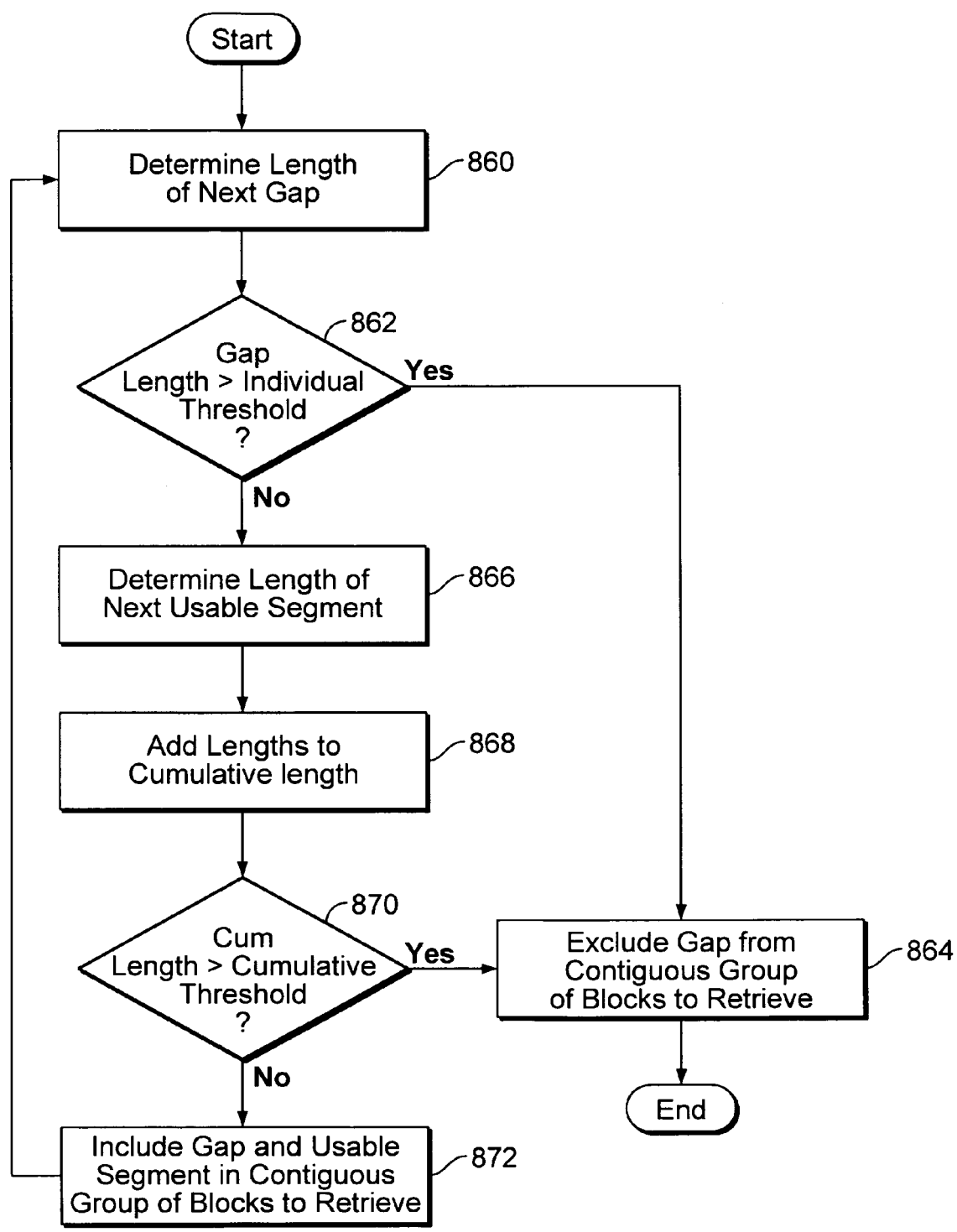
FIG. 8C is a flowchart illustrating an embodiment of a process for determining a contiguous group of blocks to retrieve based on gap length and cumulative length.

FIG. 8C is a flowchart illustrating an embodiment of a process for determining a contiguous group of blocks to retrieve based on gap length and cumulative length. In the example shown, the end of contiguous group of blocks occurs when a gap is longer than an individual threshold or the length of a potential contiguous group of blocks is greater than a cumulative threshold.

At 860, a length of a next gap is determined. For example, the length of gap 704 is determined in any appropriate unit. It is decided at 862 whether the gap length is greater than an individual threshold. If it is, the gap is excluded from a contiguous group of blocks to retrieve at 864. In some embodiments, the next contiguous group of blocks begins with a subsequent usable segment (e.g., a contiguous group of blocks begins with usable segment 706 if the length of gap 704 is greater than an individual threshold).

If a gap is not greater than an individual threshold, at 866 the length of a next usable segment is determined. In some embodiments, the usable segment referred to at 866 follows the gap referred to at 860. For example, the length of usable segment 706 is determined if the length of gap 704 is determined at 860. Lengths are added to a cumulative length at 868. In some embodiments, an initial cumulative length is equal to the length of the first usable segment in a contiguous group of blocks. For example, the lengths of gap 704 and usable segment 706 are added to an initial cumulative length equal to the length of usable segment 702. At the next pass, the cumulative length is equal to the sum of usable segments 702 and 706 and gap 704.

It is decided at 870 whether a cumulative length is greater than a cumulative threshold. If it is, a gap is excluded from a contiguous group of blocks to retrieve at 864. If a cumulative length is not greater than a cumulative threshold, a gap and usable segment are included in contiguous group of blocks to retrieve at 872 and the length of a next gap is determined at 860.

Figure 9:
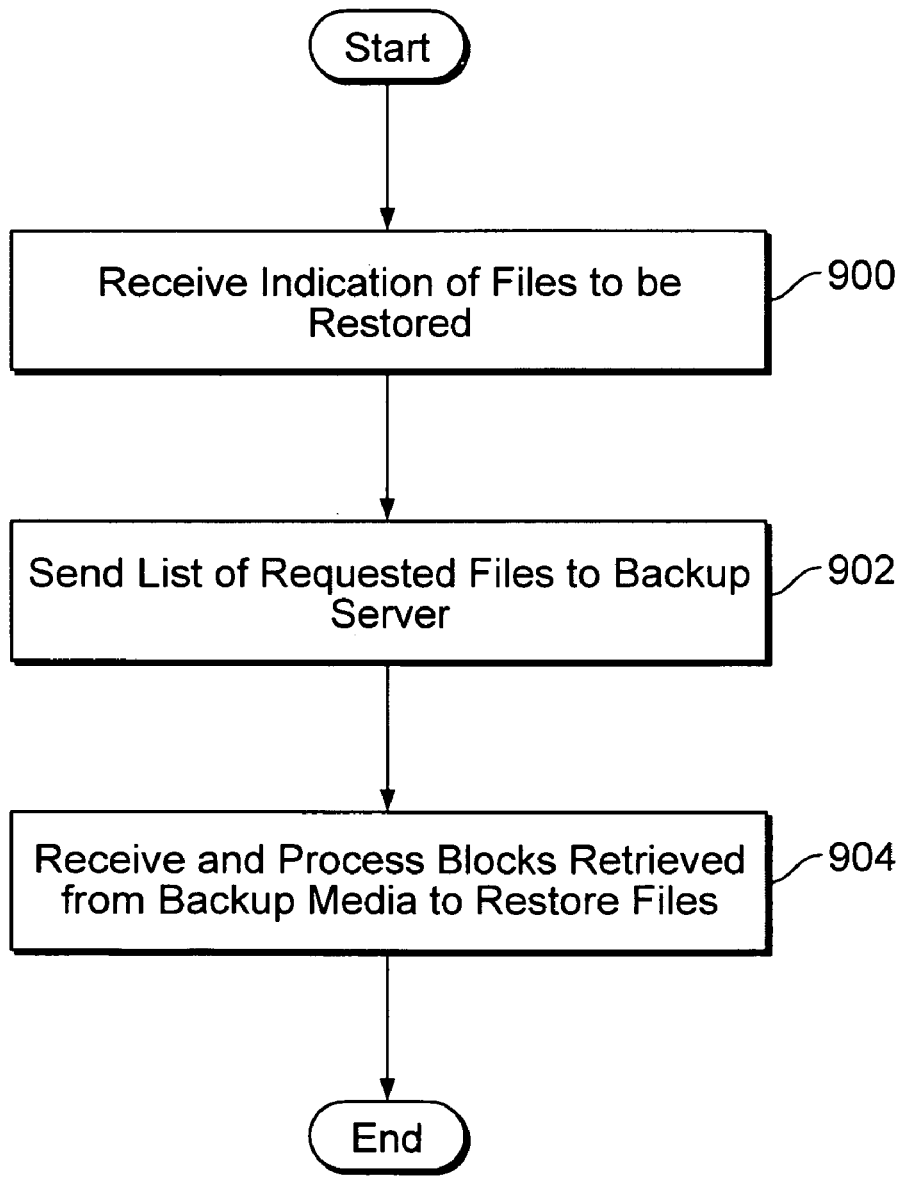
FIG. 9 is a flowchart illustrating an embodiment of a process performed by a client or agent running on a restoration target to restore one or more files on the restoration target.

FIG. 9 is a flowchart illustrating an embodiment of a process performed by a client or agent running on a restoration target to restore one or more files on the restoration target. In the example shown, a client or agent running on a restoration target is configured to interact with or otherwise communicate with a counterpart process running on a backup server and/or a backup storage device to restore one or more files on a restoration target.

At 900, an indication of files to be restored is received. In some embodiments, a user interacts with a restoration related interface to initiate a restore, select the files to be restored, select a version of a file to be restored, set restoration settings/parameters, designate restoration target(s), etc. In some applications, files being restored on a restoration target do not necessarily exist on a restoration target (e.g., a restoration target is an initial or "empty" state) and/or some files that exist on a restoration target are not being restored.

A list of files to be restored is sent to a backup server at 902. In some embodiments, an unsorted or otherwise unordered list is sent to a backup server. In some embodiments, a sorted list is sent. At 904, blocks retrieved from backup media are received and processed to restore files. In some embodiments, a contiguous group of blocks that includes at least one block that is not associated with a file to be restored is received. In some embodiments, all received blocks are associated with a file to be restored. To restore a file, in some embodiments a file corresponding to a block being processed is opened and data included in the block is written to the file at the corresponding file offset determined by the metadata table. In some embodiments, multiple blocks are needed to restore a particular file.

In some embodiments, the processing performed on a restoration target varies from the example described herein. For example, in some embodiments, a user or process interacts with a backup server to specify the files to be restored and a list of files to be restored is not sent from a restoration target.

Figure 10:
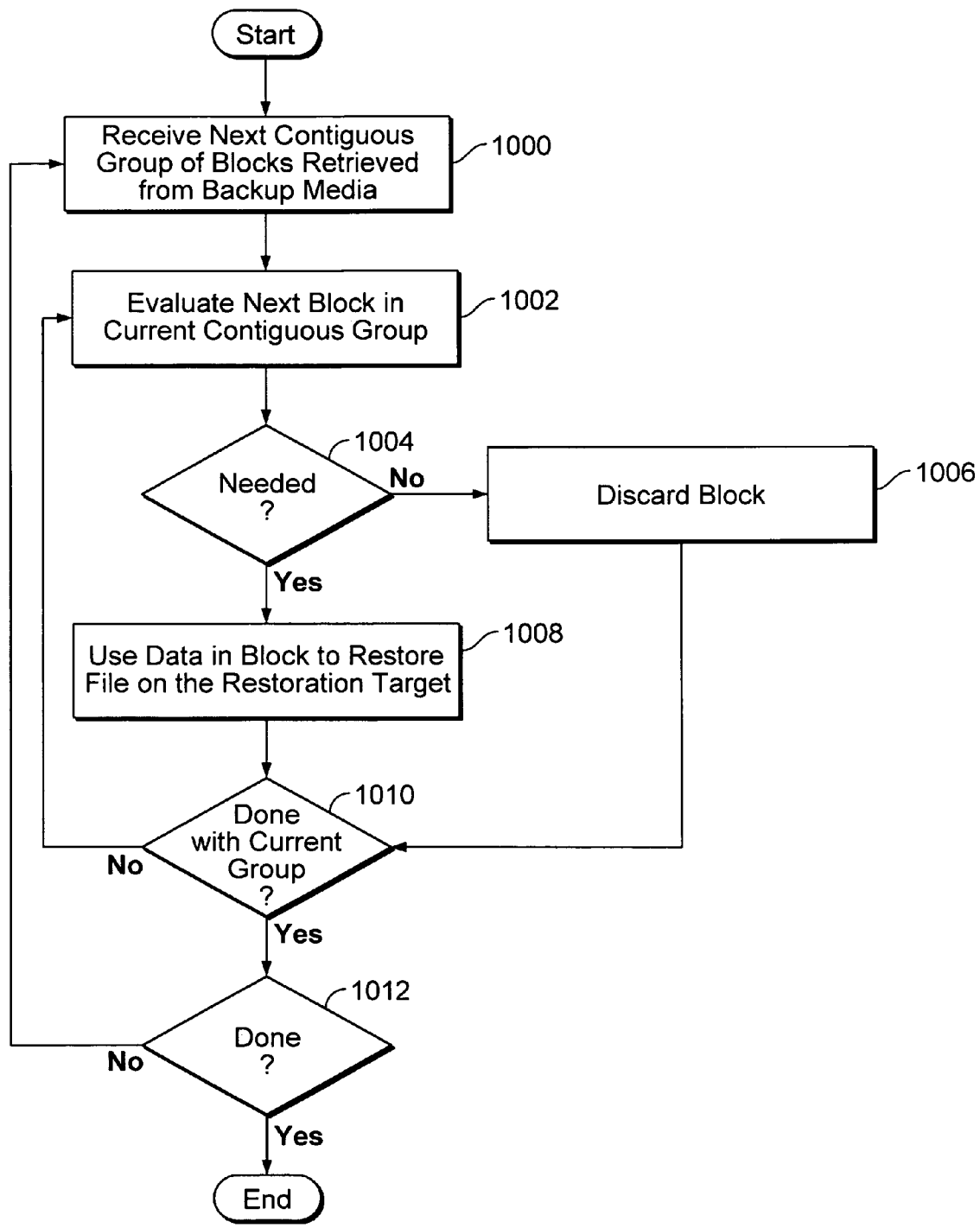
FIG. 10 is a flowchart illustrating an embodiment of a process for receiving and processing a contiguous group of blocks at a restoration target.

FIG. 10 is a flowchart illustrating an embodiment of a process for receiving and processing a contiguous group of blocks at a restoration target. In the example shown, an agent or client running on a restoration target determines which blocks in a contiguous group are needed to restore one or more files on a restoration target.

At 1000, a next contiguous group of blocks retrieved from backup media is received. A contiguous group of blocks does not necessarily include all blocks needed to restore files on a restoration target. In some embodiments, multiple contiguous groups of blocks are received and used to restore files on a restoration target. At 1002, a next block in current contiguous group is evaluated. Blocks in a contiguous group are processed in any order. In some embodiments, blocks are processed in order of their placement or location within a contiguous segment. Referring to FIG. 7, the first block in usable segment 702 is processed, then the second block, etc. Blocks in gap 704 are then processed and blocks in usable segment 706 are then processed. In some embodiments, blocks are processed out of order with respect to their placement or location within a contiguous segment.

At 1004 it is decided whether a block is needed. For example, blocks in usable segments 702 and 706 are associated with a file being restored and are needed. Blocks in gap 704 are not associated with a file being restored and are not needed. If a block is needed, data in a block is used to restore a file on a restoration target at 1008. In some embodiments, a file corresponding to the block is opened or created on the restoration target, data in the block is written to the file at the corresponding file offset, and the file is closed. If a block is not needed, it is discarded at 1006.

After discarding a block at 1006 or using a block to restore a file at 1008, it is decided whether a current contiguous group of blocks is done at 1010. For example, if all blocks in a contiguous group of blocks have been processed, the current contiguous group is done. If a current contiguous group is not done, a next block in a contiguous group is evaluated at 1002. Otherwise, it is decided at 1012 whether a process is done. If the process is not done, a next contiguous group of blocks is received at 1000.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of retrieving information comprising:
   determining a contiguous group of blocks comprising at least one of a plurality of blocks associated with one or more data objects to be restored and at least one block not associated with the one or more data objects to be restored, wherein the at least one block not associated with the one or more data objects to be restored includes an empty block; and
   obtaining the contiguous group of blocks.

2. A method as recited in claim 1, further comprising determining the plurality of blocks associated with one or more data objects to be restored.

3. A method as recited in claim 1, wherein the contiguous group of blocks is stored contiguously on a backup media.

4. A method as recited in claim 1, wherein the one or more data objects to be restored are restored to a restoration target, and there is at least one data object on the restoration target that is unaffected by restoring the one or more data objects to be restored.

5. A method as recited in claim 1, wherein determining the contiguous group of blocks is based at least in part on block location associated with backup media.

6. A method as recited in claim 1 further comprising removing from the obtained contiguous group of blocks at least one block that is not associated with the one or more data objects to be restored.

7. A method as recited in claim 1 further comprising forwarding to a restoration target at least one obtained block that is associated with the one or more data objects to be restored.

8. A method as recited in claim 1, wherein the one or more data objects to be restored includes a file.

9. A method as recited in claim 1, wherein a first block in the contiguous group of blocks is associated with the one or more data objects to be restored.

10. A method as recited in claim 1, wherein the contiguous group of blocks is obtained from backup media.

11. A system for retrieving information comprising:
    a processor; and
    a memory coupled with the processor, wherein the memory is configured to provide the processor with instructions which when executed cause the processor to:
    determine a contiguous group of blocks comprising at least one of a plurality of blocks associated with one or more data objects to be restored and at least one block not associated with the one or more data objects to be restored, wherein the at least one block not associated with the one or more data objects to be restored includes an empty block; and
    obtain the contiguous group of blocks.

12. A system as recited in claim 11, wherein the memory is configured to provide the processor with further instructions to determine the contiguous group of blocks based at least in part on block location associated with backup media.

13. A system as recited in claim 11, wherein the memory is configured to provide the processor with further instructions to remove from the obtained contiguous group of blocks at least one block that is not associated with the one or more data objects to be restored.

14. A system as recited in claim 11, wherein the memory is configured to provide the processor with further instructions to forward at least one obtained block that is associated with the one or more data objects to be restored.

15. A computer program product for retrieving information, the computer program product being embodied in a computer storage readable medium and comprising computer instructions for:
    determining a contiguous group of blocks comprising at least one of a plurality of blocks associated with the one or more data objects to be restored and at least one block not associated with one or more data objects to be restored, wherein the at least one block not associated with the one or more data objects to be restored includes an empty block; and
    obtaining the contiguous group of blocks.

16. A computer program product as recited in claim 15, wherein the computer instructions for determining the contiguous group of blocks include computer instructions for determining based at least in part on block location associated with backup media.

17. A computer program product as recited in claim 15, the computer program product further comprising computer instructions for removing from the obtained contiguous group of blocks at least one block that is not associated with the one or more data objects to be restored.

18. A computer program product as recited in claim 15, the computer program product further comprising computer instructions for forwarding at least one obtained block that is associated with the one or more data objects to be restored.

* * * * *